US012617722B2

(12) United States Patent
Esperandio de Oliveira

(10) Patent No.: US 12,617,722 B2
(45) Date of Patent: May 5, 2026

(54) POLYMERIC COMPOSITE, PRODUCT WITH POLYMER COMPOSITE, DRY PROCESS FOR PREPARING POLYMER COMPOSITE, PROCESS FOR PREPARING A SLEEPER

(71) Applicant: Sileto Technologies LLC, Miami Gardens, FL (US)

(72) Inventor: Geiza Esperandio de Oliveira, Rio de Janeiro (BR)

(73) Assignee: Sileto Technologies LLC, Miami Gardens, FL (US)

( * ) Notice: Subject to any disclaimer, the term of this patent is extended or adjusted under 35 U.S.C. 154(b) by 0 days.

(21) Appl. No.: 19/109,956

(22) PCT Filed: Sep. 8, 2023

(86) PCT No.: PCT/BR2023/050297
§ 371 (c)(1),
(2) Date: Mar. 7, 2025

(87) PCT Pub. No.: WO2024/050616
PCT Pub. Date: Mar. 14, 2024

(65) Prior Publication Data
US 2025/0257009 A1 Aug. 14, 2025

(30) Foreign Application Priority Data
Sep. 9, 2022 (BR) .......................... 102022018065-2

(51) Int. Cl.
*C04B 26/10* (2006.01)
*C04B 26/04* (2006.01)
*E01B 3/36* (2006.01)
*C04B 103/00* (2006.01)
*C04B 111/50* (2006.01)

(52) U.S. Cl.
CPC ............ C04B 26/10 (2013.01); C04B 26/045 (2013.01); E01B 3/36 (2013.01); *C04B 2103/0056* (2013.01); *C04B 2111/50* (2013.01)

(58) Field of Classification Search
CPC ................................ C04B 26/10; C04B 26/04
USPC ........................................................... 524/65
See application file for complete search history.

(56) References Cited

FOREIGN PATENT DOCUMENTS

| | | | | |
|---|---|---|---|---|
| CN | 109456590 | A | 3/2019 | |
| JP | 2000120001 | A | 4/2000 | |
| JP | 2000129602 | A | 5/2000 | |
| WO | WO-2017222250 | A1 * | 12/2017 | ............. C04B 33/36 |
| WO | 2021207809 | A1 | 10/2021 | |

* cited by examiner

*Primary Examiner* — Deve V Hall
(74) *Attorney, Agent, or Firm* — GrowIP Law Group LLC

(57) ABSTRACT

The present invention relates to a polymeric composite, polymeric composite product, dry polymeric composite preparation process, sleeper preparation process. The polymeric composite comprises: sand; at least one load; a thermosetting resin selected from at least one of dicyclopentadiene, neopentyl glycol or a combination of these; at least two additives, wherein one of the additives is a phase compatibilizing additive and the other additive is a flexibilizing additive; and a fiber selected from at least one of: carbon fiber, metallic fiber, glass fiber, aramid fiber, basalt fiber, graphite fiber, polymeric fiber or a combination of these.

18 Claims, 2 Drawing Sheets

POLYMERIC COMPOSITE, PRODUCT WITH POLYMER COMPOSITE, DRY PROCESS FOR PREPARING POLYMER COMPOSITE, PROCESS FOR PREPARING A SLEEPER

CROSS-REFERENCE TO RELATED APPLICATIONS

This application is a U.S. National Phase Application of International Application No. PCT/BR2023/050297, filed on Sep. 8, 2023, which claims priority to Brazilian patent application Ser. No. 102022018065-2, filed on Sep. 9, 2022, the entireties of which are hereby incorporated by reference.

The present invention relates to a polymeric composite, a product with a polymeric composite, a process for preparing a dry polymeric composite, a process for preparing a sleeper.

DESCRIPTION OF THE STATE OF THE ART

Materials called polymeric composites are used when there is a need to obtain materials that are more resistant than pure polymers or for applications in which it is desired to obtain specific qualities for the material. In general, these materials comprise polymeric matrices, loads, additives and/or agents, such components being in varying quantities depending on the application.

An example of use for polymer composite materials is the application in sleepers. Known sleepers use concrete and structural reinforcements that limit their mechanical strength, durability and application, in addition to presenting disadvantages in the manufacturing process and high weight. Advances in this area have sought to provide new advantages to sleepers, as is the case with the Brazilian addition certificate document BRC10403092-3 which describes a plastic concrete sleeper that uses sand and resin in its composition. However, the mechanical properties obtained by the sleeper described in this document have limitations, such as, for example, the tensile strength that is similar to that of concrete.

Another example of a known sleeper is described in document BR102014007171-7, which describes a sleeper formed by overlapping layers of wooden sheets bonded together using structural synthetic polymer resin. However, the use of wood in sleepers, especially eucalyptus wood described in this document, presents considerable disadvantages, such as low durability, risk of fungal attack and insect proliferation, water/humidity absorption with consequent alteration of mechanical properties.

It is noted that known polymer composites have mechanical limitations that limit their use. This gap can be observed, for example, in the area of sleepers, where the results obtained by known and commercially exploited materials are still insufficient.

In addition, polymeric composites and processes for manufacturing polymeric composites and/or products that use such materials require the use of water and/or do not take into account the hygroscopy of the plaster.

Materials commonly used in sleepers have disadvantages that can be summarized as follows: hardwood is currently prohibited for the manufacture of wooden sleepers; eucalyptus wood has low durability when compared to other sleepers; concrete presents rapid deterioration in the reinforced structure, due to corrosion.

Objectives of the Invention

In view of the problems described in the state of the art, the present invention aims to provide a polymeric composite with high mechanical resistance (resistance to axial compression and 4-point bending, as well as high resistance to abrasion), excellent dielectric properties, low porosity and water absorption; chemical and corrosion resistance, in addition to a lower density than that commonly found in other structural composites.

Another objective of the present invention is to provide a polymeric composite that potentially presents several applications, among which we can mention: metric gauge sleepers, wide gauge sleepers, crosses, purlins, beams, precast tiles, pre-shaped gutters, molded floors, interlocking floors, precast civil construction panels, artificial stone for countertops and floors, paving slabs used on bridges, road coverings on bridges and highways, precast slabs, covering and cobogó hollow bricks.

Another objective of the present invention is to provide a polymeric composite that, compared to wood, does not suffer fungal attack and consequent proliferation of insects and does not deteriorate over time; it is resistant to rot, insect attack and solar radiation; and eventual absorption of water does not result in the loss of hardness or other mechanical properties, as it occurs due to eventual porosity, without chemical reaction with water, acids, bases and organic compounds in eventual spills.

Another objective of the present invention is to provide a polymer composite that, compared to reinforced concrete, is lighter and waterproof as it does not require an iron frame similar to that of reinforced concrete in its structure; and does not contain toxic components after curing.

Another objective of the present invention is to provide a polymeric composite free of voids or shrinkage; has insulating properties; admits any dimension; it is inert and impermeable; highly homogeneous generating reliability.

The present invention also aims to provide a product comprising the polymeric composite of the present invention, such as, for example, a sleeper that behaves with satisfactory performance when subjected to rolling stock or traction loads with up to 40 tons per axle in broad gauge or smaller loads in metric and standard gauges.

Another objective of the present invention is to provide a product that comprises the polymeric composite of the present invention, such as, for example, a sleeper that presents a performance compatible with the performance presented by pure heartwood wooden sleepers to the same spacing as that adopted for wood.

Another objective of the present invention is to provide a product that comprises the polymeric composite of the present invention, such as, for example, a sleeper that does not show signs of crushing or deformation in the region of the fixings, when subjected to conditions of traffic cited in this document.

Another objective of the present invention is to provide a product that comprises the polymeric composite of the present invention, such as, for example, a sleeper that has an integral cross-section, free from voids or sucking up.

Another objective of the present invention is to provide a product that comprises the polymeric composite of the present invention, such as, for example, a sleeper that has insulating properties, offering no risk of occupancy of the track circuit.

The present invention also aims to provide a process for preparing a dry polymer composite and/or a sleeper with the objectives described above.

Another objective of the present invention is to provide a process for preparing a dry polymeric composite and/or a sleeper that does not use water in its production and does not generate liquid effluents.

BRIEF DESCRIPTION OF THE INVENTION

The present invention relates to a polymeric composite, which comprises: sand; at least one load; a thermosetting resin selected from at least one of dicyclopentadiene, neopentyl glycol or a combination thereof; at least two additives, wherein one of the additives is a phase compatibilizing additive and the other additive is a flexibilizing additive; and a fiber selected from at least one of: carbon fiber, metallic fiber, glass fiber, aramid fiber, basalt fiber, graphite fiber, polymeric fiber or a combination of these.

Optionally, the load is selected from at least one of: granular silica or microspheres, high and low purity alumina quartz, foundry sand, fine or ultrafine sand, limestone, talc, crushed stone powder, plaster, lime, dolomite, calcite, barite, in natura or organophilic bentonite, in natura or organophilic kaolinite, in natura or organophilic metakaolinite, natural or organophilic attapulgite, in natura or organophilic montmorinolite, in natura or organophilic illite, hinorite in natura or organophilic, in natura or organophilic anite, in natura or organophilic sepiolite, in natura or organophilic vermiculite, porous magnetite, calcium carbonate, magnesium carbonate, mica, graphite, gypsum, gilsonite or a combination of these.

Optionally, the phase compatibilizing additive is selected from at least one of: vinyltrimethoxysilane, vinyltriethoxysilane, methacryltrimethoxysilane, methacryloxypropyltrimethoxysilane, calcium diacrylate, zinc diacrylate or a combination of these.

Optionally, the flexibilizing additive is selected from at least one of: butylacrylate, butylmethylacrylate, methylmethacrylate, acrylic acid, methacrylic acid, phthalic anhydride, maleic anhydride, dialylphthalate, triethylene glycol methacrylate, ethylhexyl methacrylate or a combination of these.

Optionally, the polymeric composite may further comprise ground rubber in an amount of 0% to 30% by mass; layered fiber blankets, the fiber being selected from at least one of: metallic fiber, glass fiber, carbon fiber, aramid fiber, basalt fiber, graphite fiber, polymeric fiber or a combination of these; screens and/or frames made of metallic and/or polymeric material in layers and/or structures; reaction promoting system, wherein the reaction promoting system is cobalt naphthenate and is comprised in an amount of 0.25% to 2.5% by mass of the composite. The reaction promoter system is associated with dimethylaniline, DMA, in an amount of 0.025% to 0.10% by mass. Optionally, the polymeric composite may further comprise a launcher in an amount ranging from 0.05% to 6.00% by mass.

Optionally, the polymeric composite may comprise: from 38% to 96% by weight of medium sand; from 3% to 33% by load mass; from 3% to 33% by mass of dicyclopentadiene and/or from 5% to 30% by mass neopentylglycol; from 0.1% to 1.5% by mass of phase compatibilizing additive; from 0.1% to 1.5% by weight of flexibilizing additive; and from 0.1% to 5%, by mass, of carbon fiber, metallic fiber, glass fiber, aramid fiber, basalt fiber, graphite fiber, polymeric fiber and/or a combination of these.

The present invention relates to a polymer composite product comprising a polymer composite, in which the fiber comprised in the composite has a fiber length between 70% and 99% of the length of the part.

The present invention relates to a dry polymer composite preparation process comprising the following steps: mixing sand and load for a period of 10 minutes to 40 minutes to form a mixture of dry components; mixing at least one phase compatibilizing additive and at least one flexibilizing additive with a thermosetting resin for a time of 10 seconds to 30 seconds to form a syrup; mix the syrup with the mixture of dry components for up to 5 minutes; insert, into the material obtained, at least one anchoring element comprising bundles of fibers, wherein the fiber is selected from at least one of: carbon fiber, metallic fiber, glass fiber, aramid fiber, fiberglass basalt, graphite fiber, polymeric fiber or a combination of these; pre-cure of the material obtained in an ambient pressure oven with air circulation, at a temperature of 50 to 80° C. for a period of 60 minutes to 180 minutes; and cure the material obtained for at least 7 days at ambient pressure and room temperature.

Optionally, the dry polymer composite preparation process comprises a step of drying the sand and load before these components are mixed; a step of mixing a launcher into the syrup for a time of 10 seconds to 30 seconds before the step of mixing the syrup with the mixture of dry components; one step is to press the material obtained for a period of 20 seconds to 60 seconds before the pre-cure step. Optionally, the pressing step can be replaced by vibration, using a concrete vibrator at different points of the mass until there is no visible air escaping from the material mixture. A typical vibration time for the material varies from 20 to 60 seconds before pressing. pre-curing stage. Optionally, the oven used in the process includes exhaust fans to remove moisture. Optionally, the greenhouse can be replaced with thermal heating blankets, respecting the same parameters of time, temperature and opening to remove moisture.

The present invention refers to a process for preparing a sleeper that comprises the steps of: preparing a polymeric composite according to a preparation process already described, and molding the material in a sleeper mold before the step of inserting the anchoring elements. Optionally, the pressing step is carried out with a load of 10 to 30 tons of force for a period of 20 to 60 seconds. Optionally, the pressing step can be replaced by the vibrating step for a period of 20 to 60 seconds.

Optionally, the anchoring elements comprise intermediate layers of bundles or blankets of at least one of: carbon fiber, metallic fiber, glass fiber, aramid fiber, basalt fiber, graphite fiber, polymeric fiber or a combination of these, in which the fibers are long longitudinal to the sleeper, being distributed in layers or grouped in bundles.

Optionally, the greenhouse used in the process comprises at least two side exhaust fans to remove moisture. Optionally, the greenhouse can be replaced with thermal heating blankets, respecting the same parameters of time, temperature and opening to remove moisture.

BRIEF DESCRIPTION OF THE DRAWINGS

The figures show the results of tests carried out in an example of execution of the invention described below.

DETAILED DESCRIPTION OF THE INVENTION

Figure 1:
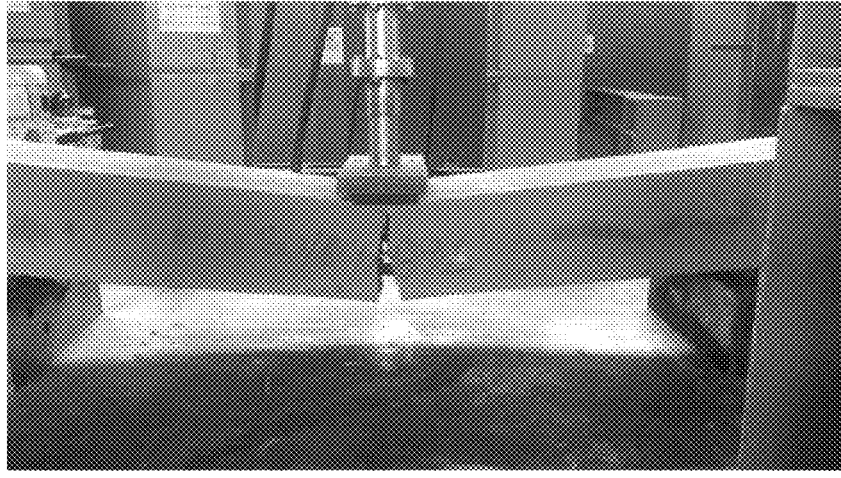
FIG. 1—is a photo illustrating a sleeper comprising an embodiment of the material of the present invention subjected to a modulus of rupture (MOR) test.

Firstly, it is worth noting that the polymer composite of the present invention can be applied or used in multiple different types of articles, products or contexts, such as railway sleepers, crosses, purlins, beams, precast tiles, gutters pre-cast, interlocking floors, pre-cast civil construction panels, artificial stone for benches and floors, paving in slabs or applied by in-situ molding used in bridges, pre-cast slabs, cladding plates, cobogó hollow bricks, among others. Although there are specific mentions of sleepers throughout the specification, this specific example of application of the material of the present invention should not be used to restrict the scope of protection unduly, this example being a way of facilitating the understanding of the material subject to the present invention.

The present invention relates, in one embodiment, to a polymeric composite comprising fine aggregates, such as, for example, sand, preferably medium sand; at least one resin being selected from at least one of dicyclopentadiene (DCPD), neopentyl glycol (NPG) for thermosetting resin and/or a combination of these; and at least one additive.

In one embodiment, the additive is selected from at least one of a phase compatibilizing additive and/or a flexibilizing additive. The phase compatibilizing additive, also called coupling agent, is selected from at least one of: vinyltrimethoxysilane, vinyltriethoxysilane, methacryltrimethoxysilane, methacryloxy-propyltrimethoxysilane, calcium diacrylate, zinc diacrylate and/or a combination of these. The flexibilizing additive, or flexibilizing agent, of the polymeric structure is selected from at least one of: butylacrylate, butylmethylacrylate, methylmethacrylate, acrylic acid, methacrylic acid, phthalic anhydride, maleic anhydride, dialylphthalate, triethylene glycolmethacrylate, ethyl-hexylmethacrylate and/or combinations of these.

In an embodiment comprising two additives, one of the additives is the phase compatibilizing additive and the other additive is the flexibilizing additive.

In one embodiment, the polymer composite of the present invention comprises at least one load being selected from at least one of: granular silica or microspheres, high and low purity alumina quartz, foundry sand, fine or ultrafine sand, limestone, talc, crushed stone powder, gypsum, lime, dolomite, calcite, barite, in natura or organophilic bentonite, in natura or organophilic kaolinite, in natura or organophilic metakaolinite, in natura or organophilic attapulgite, in natura or organophilic montmorinolite, raw or organophilic illite, raw or organophilic hinorite, raw or organophilic anite, raw or organophilic sepiolite, raw or organophilic vermiculite, porous magnetite, calcium carbonate, magnesium carbonate, mica, graphite, gypsum and gylsonite and/or a combination of these whose mixture is suitable for meeting load and distribution requests for ballast.

In one embodiment, the polymer composite of the present invention comprises a fiber selected from at least one of: carbon fiber, metallic fiber, glass fiber, aramid fiber, basalt fiber, graphite fiber, polymeric fiber and/or a combination of these. The fibers used can be short and uniformly distributed in the matrix, or long and aligned in a single direction, and can also be arranged in layers or fibrous cores.

In one embodiment, the polymer composite of the present invention comprises ground rubber, such rubber may come from tires.

In one embodiment, the polymer composite of the present invention comprises metallic or polymeric fabrics and frames in layers or structures.

The components described above for the different embodiments of the present invention can be combined in different ways, with at least two components being combined to generate a distinct version of the present invention. The details and possible concentrations of each component will be described below.

Resin:

The resin present in the polymer composite of the present invention is a thermosetting resin. The resin is selected from at least one of dicyclopentadiene (DCPD), neopentyl glycol (NPG) and/or a combination of these.

DCPD:

Dicyclopentadiene (DCPD) is a chemical compound with formula $C_{10}H_{12}$. At room temperature, it is a light yellow liquid with a dry odor. The greatest use is in resins, particularly unsaturated polyester resins. It is also used in paints and adhesives.

In the present invention, DCPD is added in an amount ranging from 5% to 30% by mass, preferably from 8% to 25% by mass and more preferably from 10 to 20% by mass, based in the total mass of the composite composition.

NPG:

Pure Neopentyl Glycol (NPG) is a crystalline, white, odorless, hygroscopic solid, being an organic compound used in the synthesis of polyesters, paints, lubricants and plasticizers. In polyester resins, NPG improves resistance to heat, light, especially ultra-violet and water. Through an esterification reaction with fatty or caboxylic acids, lubricating esters with reduced oxidation and hydrolysis potential can be achieved. NPG is also used in the manufacture of alkyd resins, polyurethane resins, in addition to the manufacture of monomers for UV-resistant paints.

NPG is industrially synthesized by the aldol reaction between formaldehyde and isobutardehyde, which forms hydroxypivaldehyde, which can be converted to neopentylglycol by excess formaldehyde or by catalytic hydrogenation of the aldehyde group to alcohol. This procedure can be carried out using a strong alkaline catalyst, such as sodium hydroxide, potassium hydroxide or calcium hydroxide. The drawback is the production of a large amount of sodium formate as a by-product, which is therefore commercially unviable. One way to get around the problem is through aldol condensation with tertiary amines as catalysts, continuing with hydrogenation using copper chromite supported on magnesium oxide as a catalyst, or a catalyst containing platinum, ruthenium and tungsten, or even a copper catalyst, zinc and zirconium. The hydrogenation of hydroxypivaldehyde can also be carried out with a nickel catalyst at a temperature below 100° C. using a mixture of aliphatic alcohol and ether as a solvent, with controlled humidity. Another method of obtaining propane-1,3-diol, disubstituted in position 2 is by reaction with ethanal, also disubstituted in position 2, with formaldehyde. Thus, the reaction between 1-4dioxin and isobutaraldehyde, in the presence of an acidic ion exchange agent, makes it possible to obtain neopentylglycol in a yield of 87%. Photolysis of 2-(2-hydroxy-5-methoxyphenyl)-5,5-dimethyl-1,3-dioxane with 300 nm light results in the formation of neopentylglycol and 2-hydroxy-5-methoxybenzaldehyde with 98% yield.

In the present invention, NPG resin is added in an amount ranging from 3% to 33% by mass, preferably from 7% to 27% by mass and more preferably from 9% to 18% by mass, based on the total mass of the composite composition.

Sand:

In an embodiment of the present invention, the sand composition is predominantly formed from silica particles, but may contain other minerals such as: feldspar, mica, zircon, magnetite, ilmenite, monazite and cassiterite. Commercial sand also has moisture, considering that it is sand of medium particle size (from 0.1 mm to 2.0 mm, or preferably from 0.2 mm to 0.6 mm) washed, to remove the largest part of organic impurities.

In the present invention, sand is added in an amount ranging from 38% to 96% by mass, preferably from 42% to 90% by mass and more preferably from 53% to 82% by mass, with based on the total mass of the composite composition.

Load:

Among the load options, the material composed of gypsum is a mineral of natural origin and extracted in deposits around the world. The polymeric composite of the present invention is preferably produced with plaster extracted from mineral deposits, but plaster from industrial processes can also be used. Its chemical formula corresponds to calcium sulfate dihydrate ($CaSO_4 \cdot 2H_2O$) which, after a calcination or dehydration process, gives rise to calcium sulfate hehydrate ($CaSO_4 \cdot \frac{1}{2}H2O$), also known as plaster. This material is made up of spherical particles with dimensions ranging from 53 μm to 150 μm. This material has a great tendency to rehydrate, being very hygroscopic, which gives it a substantial increase in its mechanical resistance.

Gypsum, also called plaster stone, is composed of calcium sulfate dihydrate, that is, it is a calcium ore whose chemical composition corresponds to the formula ($CaSO_4 \cdot 2H2O$). It is a mineral, generally, with a color that varies from white to translucent, presenting a micaceous, lamellar appearance, a pearly shine, an unctuous (or fibrous) feel, in addition to a low hardness of the order of 2.0. It is the most abundant sulfate in the Earth's crust, occurring in evaporites or in the form of interstratified layers of shale, limestone and clay, and can also be found in meteorites. Through calcination, gypsum loses its water of crystallization, and can then be transformed into plaster when it retains crystallized water ($CaSO4 \cdot \frac{1}{2}H2O$), or calcium sulfate (anhydrite) when it completely loses crystallized water ($CaSO_4$).

The main application of gypsum is in the manufacture of cement, but it is also used in the manufacture of sulfuric acid, chalk, glass, enamels, plaster and in the production of beer. Furthermore, plaster or calcium sulfate is also used as a material for casting molds; dehydrating; binder and soil improver (supplier of calcium and sulfur), in addition to being used in metallurgy (in the formation of slag).

Another very important source is agricultural plaster, produced as a by-product in the production of phosphoric acid. Agricultural plaster originates from the reaction of sulfuric acid with phosphate rock, carried out with the aim of producing phosphoric acid, this means that plaster is a by-product of the manufacture of $H_3PO_4$: $Ca_{10}(PO_4)_6F2+ 10H_2SO_4 + 20H_2O \leftrightarrow 10CaSO_4 \cdot 2H_2O + 6H_3PO_4 + 2HF$ For each ton of phosphoric acid produced, around 4.5 tons of plaster is generated.

In addition to plaster and/or gypsum, other loads can be used, such as: granular silica or microspheres, high and low purity alumina quartz, foundry sand, fine or ultrafine sand, residual sand from the mining process, limestone, talc, crushed stone powder, plaster, lime, dolomite, calcite, barite, in natura or organophilic bentonite, in natura or organophilic kaolinite, in natura or organophilic metakaolinite, in natura or organophilic attapulgite, in natura montmorinolite or organophilic, raw or organophilic illite, raw or organophilic hinorite, raw or organophilic anite, raw or organophilic sepiolite, raw or organophilic vermiculite, porous magnetite, calcium carbonate, magnesium carbonate, mica, graphite, gypsum and gilsonite and/or a combination of these whose mixture is suitable for meeting mechanical demands.

The use of these loads is initially due to the packing effect of the particles in the material. The use of a load with a larger grain size, such as sand, generates voids between the grains, which can be occupied by particles of smaller grain size, reducing the volumes of pores and voids, which increases compressive resistance of the material. The technical effect obtained by the load is physical and can be obtained by the aforementioned loads.

The application of plaster, however, also proved to comprise, in this case, a relevant chemical component, in addition to the physical aspect of packaging. As plaster is a highly hygroscopic material, the water produced in the polymerization reaction is captured by the plaster particles present in the material, removing water from the reaction medium, allowing a more efficient cure, which produces a final material with properties improved mechanics compared to loads that do not have this effect. But for this phenomenon to happen, the dehydration of the plaster must be ensured by subjecting it to the heating drying process, in which humidity is reduced by more than 90%. The use of plaster as received, without going through the drying process, generates a deleterious effect on the final material, as the water present in the plaster is released during the heating used at the beginning of the polymerization reaction, interfering with the curing of the material, many even preventing consolidation of the final material, the material does not create mechanical resistance or crumbles.

Some of the loads mentioned are not hygroscopic and are even considered inert, producing only the packaging effect described previously. Other loads, among those mentioned, such as clay minerals, are also hygroscopic and, like plaster, can promote the same packaging and sequestration effects of the water produced as a by-product of the polymerization reaction. However, some clay minerals have transition metals in their structures, which can catalyze unwanted side reactions during polymerization, altering the mechanical properties of the material obtained.

In the present invention, load is added in an amount ranging from 3% to 33% by mass, preferably from 5% to 26% by mass and more preferably from 7% to 18% by mass, with based on the total mass of the composite composition.

Reaction Promoter System:

A reaction promoting system is composed of chemicals that, when used alone, do not interfere with the polymerization reaction, but which, when combined, greatly accelerate the reaction. In some embodiments, its use is optional, depending on the reaction time. In one embodiment, the polymeric composite of the present invention comprises a reaction promoting system that is mixed with the resin in an amount ranging from 0.05% to 13%, or preferably, from 0.10% to 6.50%, or more preferably, from 0.25% to 2.50%, by mass, based on the total mass of the composite. Preferably, 0.25 to 2.50% of cobalt naphthenate or cobalt octoate is used, which can be used alone or associated with dimethylaniline (DMA) in an amount ranging from 0.025% to 0.10%.

Launcher:

A launcher is a chemical compound that, due to the effect of heat or radiation or just chemical reactivity, undergoes self-scission, forming either a free radical, or an anion or a cation capable of initiating the polymerization reaction. In the present invention, the launcher undergoes self-scission by heat forming a free radical that initiates mass polymerization via radical. In one embodiment, the polymeric composite of the present invention comprises a launcher in an amount ranging from 0.01% to 6.00%, or preferably, from 0.05% to 3.00%, or even more preferably, from 0.10% to 2.00% by mass, based on the total mass of the composite. Preferably, from 0.08% to 2.00%, or preferably, from 0.10% to 1.50% of methyl ethyl ketone peroxide compound, of medium reactivity, desensitized with dimethylphthalate, is used.

Phase Compatibilizing Additive:

Phase compatibilizing agents have a chemical chain that has one side with chemical affinity for the organic phase and the other side with chemical affinity for the inorganic phase, each side reacting with the respective phase, thus creating a kind of chemical bridge between phases. This causes the adhesion between the materials to increase substantially, as a chemical adhesion is created instead of just a physical adhesion through the interaction of porosities and recesses, increasing the tensile strength of the material. In one embodiment, the polymeric composite of the present invention comprises the phase compatibilizing additive, also called coupling agent, used in an amount ranging from 0.05% to 2.0%, or preferably, 0.1% to 1.5%, or more preferably, from 0.15% to 1.0% by weight of the compound, preferably vinyltrimethoxysilane or vinyltriethoxysilane, but which may be replaced by at least one of methacryltrimethoxysilane, methacryloxypropyltrimethoxysilane, calcium diacrylate, zinc diacrylate and/or a combination of these.

Flexibilizing Additive:

Flexibilizing agents can chemically bond to the polymer chains, or can form structures interspersed with the polymer chains. In the case of flexibilizing agents that chemically bond to the polymer, the flexibilizing group functions as a type of spring in the chain, increasing flexibility and, therefore, tensile strength. These groups are small energy absorbers, which allow the material to deform minimally on the scale of the polymer chain, but visually imperceptible, and disperse energy, increasing flexibility and tensile strength.

On the other hand, the flexibilizing agents that form structures interspersed with the polymers, create slightly larger energy absorption structures, which also cause slightly larger deformations, but still visually imperceptible, acting in a similar way, absorbing energy, promoting small deformations and releasing energy to neighboring structures, dissipating them.

In one embodiment, the polymer composite of the present invention comprises the polymeric structure flexibilizing additive, used in an amount ranging from 0.05% to 2.0%, or preferably, from 0.1% to 1.5%, or more preferably, from 0.15% to 1.0% by mass of the compound, being selected from at least one of butyl acrylate, butylmethyl acrylate, methyl methacrylate, triethylene glycol methacrylate, ethylhexyl methacrylate, acrylic acid, methacrylic acid, phthalic anhydride, maleic anhydride, dialylphthalate, triethylene glycol methacrylate, ethylhexyl methacrylate and/or a combination of these.

Ground Rubber:

Ground rubber functions as a physical impact absorber within the composite, creating a potential increase in impact resistance and flexural resistance properties, with its use being optional depending on the application. In one embodiment, the polymer composite of the present invention comprises ground rubber. The ground rubber may come from tires in an amount ranging from 0.1% to 30%, or preferably, from 1% to 18%, or more preferably, from 5% to 10%, by mass, based on the mass total of the composite.

Fibers:

Fibers are applied in the present invention as a safety mechanism, especially for application in sleepers, beams and structural parts that undergo bending stress. Despite the articles mentioned, other applications not foreseen in this report can use the composite of the present invention with fibers to achieve the desired properties. Considering that the material, despite having very high rupture loads, which makes rupture and breakage events less likely, has the characteristic of a brittle fracture and that even with the use of phase compatibilizing and flexibilizing agents, the material does not have enough ductility to signal when it is close to the breaking load, as it does not have a yield limit, breaking abruptly when it is reached. Thus, the use of fibers, mainly long fibers, applied longitudinally to the part, only supported on the material itself during molding, without applying any traction effort, provides an anchorage in the part, in the event of rupture, ensuring that the sleeper it does not separate into distinct parts, only generating cracks in the structure, which allows, for example, a sleeper to maintain its bearing and not cause accidents in the line.

FIG. 1 illustrates a sleeper subjected to the modulus of rupture (MOR) test. It is noted that, even though the sleeper had suffered total structural failure, the parts did not separate. This is due to the anchoring effect of the parts promoted by the presence of fibers inside the sleeper.

Only synthetic fibers were considered in this application, as constant tensile strength is required. Vegetable fibers have mechanical properties that are highly dependent on the conditions of the plant from which they were extracted. Excess or lack of water, sunlight, nutrients, etc. They drastically modify the mechanical properties of plant fibers, making it very difficult to achieve repeatability and reproducibility in a process. Thus, in some embodiments, vegetable fibers should not be used. On the other hand, synthetic fibers present mechanical properties controlled only by their production process, and once the process is controlled, they present repeatability and reproducibility in their properties.

In some embodiments of the present invention, the fibers can also function as structural reinforcement increasing the traction of the material, being used as short fibers uniformly distributed in the matrix for other applications of the composite of the present invention. The present invention comprises a fiber selected from at least one of: carbon fiber, metallic fiber, glass fiber, aramid fiber, basalt fiber, graphite fiber, polymeric fiber and/or a combination of these. The fibers used can be short and uniformly distributed in the matrix, or long and aligned in a single direction, depending on the application of the composite of the present invention. For the specific case of sleepers, structural applications or applications that require traction reinforcement, the fibers must preferably be long and aligned in the direction of the length of the part, occupying the entire length of the object. For sleepers, for example, it can occupy the entire length between the external shoulders, the region where the sleeper suffers the greatest mechanical stress.

The fibers are comprised in an amount ranging from 0.05% to 10%, or preferably, from 0.1% to 5%, or more preferably, from 0.2% to 1% by mass, based on the total mass of the composite. Preferably, glass, metallic or carbon fibers are used.

The fiber included in the composite has a fiber length necessary to prevent catastrophic rupture in the place where there is greater fragility and/or greater loads applied to the part. In the case of the sleeper, the function is to avoid catastrophic rupture that would allow the gauge to open, that is, the entire length between the abutments. The sleeper suffers greater efforts in the region of the supports (where the rails are located) and in the center of the piece (where it suffers traction). These are the critical points where rupture events occur, therefore the fiber must be long enough to cover the entire length between the two outer abutments of the sleeper. Other similar examples can be understood analogously to the situation described for the sleeper.

In one embodiment, the fiber length comprises between 70% and 99%, preferably, between 85% and 95%, or even more preferably, between 88% and 92% of the length of the part or product.

Figure 2:
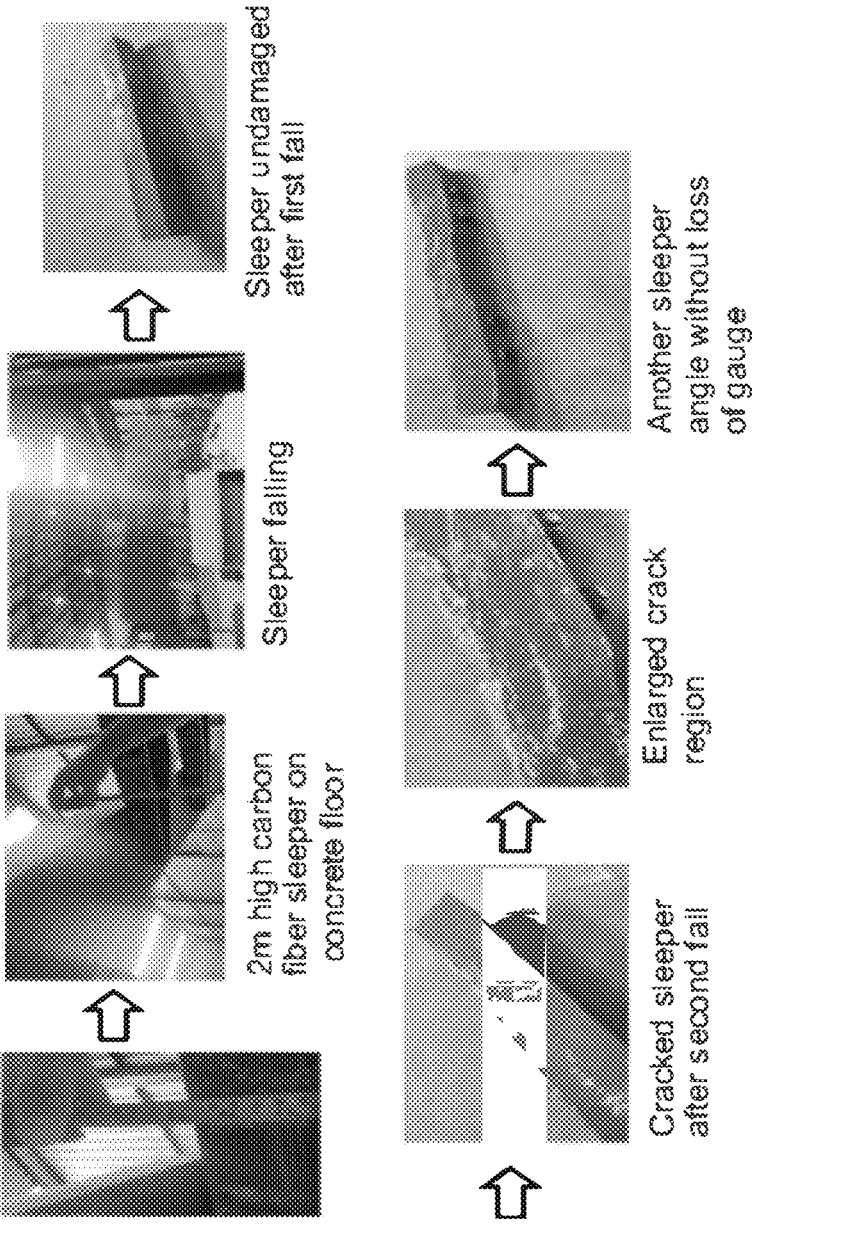
FIG. 2—is a sequence of photos illustrating a sleeper comprising an embodiment of the material of the present invention subjected to drop tests.

In one embodiment, the polymer composite of the present invention comprises carbon fiber. Tests carried out with carbon fiber have resulted in a material with superior tensile strength, reduced cracking, and increased resistance to drops in preliminary impact tests and/or the possibility of reducing the number of fibers to obtain the same technical effect as the others with a consequent reduction in manufacturing costs. FIG. 2 illustrates a sequence of photos retained from drop test videos of the carbon fiber reinforced sleeper. In the first fall from a height of 2 m onto a concrete floor, it is noted that there was no apparent damage to the sleeper. In the second fall, the sleeper cracked in the region of a shoulder, maintaining, however, the integrity of the piece and the gauge of the sleeper.

Structures:

As well as fibers, metallic structures or fiber composites, such as fiber rebars (glass, aramid, carbon, basalt, graphite, metallic or polymeric), can also be used in the form of wires, rebars or screens to promote increased mechanical resistance of the material for specific applications. For the specific case of sleeper application, structures such as rebar, blades or profiles can be used to replace the fiber bundle as a safety system for catastrophic rupture with eventual loss of gauge by the sleeper.

In one embodiment, the polymeric composite of the present invention comprises metallic or polymeric structures of wires or fabrics in an amount ranging from 0.05% to 10%, or preferably, from 0.1% to 5%, or more preferably, from 0.2% to 1% by mass, based on the total mass of the composite. Preferably, metallic or polymeric structures are used.

In one embodiment, the length of rebar and metallic or polymeric wire or mesh structures comprises between 70% and 99% of the length of the part, preferably between 85% and 95%, or even more preferably, between 88% % and 92% of the length of the part.

Finishes:

In one embodiment, the polymer composite of the present invention comprises finishes, such as dyeing or polishing. Such finishes can be used optionally depending on the application of the product produced.

In a preferred embodiment, the polymer composite of the present invention is used in the preparation of various products such as railway sleepers, crosses, purlins, beams, precast tiles, precast gutters, interlocking pavement blocks, precast civil construction panels, artificial stone for countertops and floors, paving in slabs or applied by in-situ molding used in bridges, precast slabs, covering slabs, cobogó hollow bricks, among others.

In this case, citing the sleeper as an example of embodiment among the possible products of the present invention, several characteristics can be observed, among which: full compliance with the requested loads, which preferably vary between 20 tons/axle up to 40 ton/shaft; longer service life than concrete sleepers; and price of the part lower than the steel part. It is noteworthy that this composite, when used in the preparation of sleepers, presents the following advantages and technical effects:

Does not contain water in its composition;

Does not have a high-density reinforced skeleton;

It is waterproof;

It is lighter than concrete with hardware;

It is completely compatible with concrete sleepers and partially compatible with wooden sleepers, accepting any shape and size;

It is a homogeneous material in its composition and can contain anchoring structures, generating greater reliability in accident prevention;

It has high resistance to stress and high mechanical resistance, both compressive and tensile in flexion and diametrical compression, as well as in fatigue processes;

It has long durability, which makes it the best cost/benefit ratio over time.

It should also be noted that the polymeric composite of the present invention is a polymeric concrete obtained by replacing part or all of the binder in conventional concrete with polymer.

Process for Preparing the Dry Polymer Composite of the Present Invention

Precast Parts Preparation Process:

The polymer composite of the present invention is preferably prepared from the process that comprises the following steps:

A. Drying of sand and plaster/or gypsum;

B. Weighing of each component consisting of at least one resin, sand, fine loads, preferably plaster;

C. Mix dry components including sand and at least one load for about 5 to 40 minutes, until very homogeneous, using a conventional mechanical mixer (concrete mixer type, or industrial mixer) or manual mixing depending on the amount of composite to be produced, at ambient pressure and temperature;

D. Addition of at least one additive, being at least one coupling agent or one flexing agent or combinations thereof into at least one resin to form the organic mixture, also called syrup. Mix for about 10 to 30 seconds.

E. Add the starter to the organic mixture or syrup and mix for approximately 10 to 30 seconds, until a homogeneous appearance is obtained.

F. Addition of the organic mixture or syrup to the mixer containing the dry aggregate mixture and subsequent mixing for up to 5 minutes, until it presents a homogeneous appearance.

G. Molding the product to be produced in a mold, preferably previously coated with a release agent, which may be paraffins, mineral oil, polymeric solution of linear polymers (polyethylene, polypropylene, polyvinyl alcohol, polyvinyl chloride, polytetrafluoroethylene), waxes vegetables or combinations thereof, or even a mold made from non-stick material.

H. Insertion of the anchoring element, preferably a bundle of long glass fibers or long carbon fibers, longitudinally accommodated in the mold, which can be replaced by layers of glass fiber blanket or carbon fiber blanket. This step is optional depending on the application.

I. Pressing in a load compatible with the artifact to be molded for approximately 20 to 60 seconds depending on the thickness of the artifact. Optionally, pressing can be replaced by vibration, using an internal vibrator in the dough, for a period of 20 to 60 seconds.

J. Pre-cure in an ambient pressure oven, with air circulation, at a temperature of 50 to 80° C. for approximately 60 to 180 minutes and subsequent curing for at least 7 days at ambient pressure and temperature. Optionally, the stove can be replaced with a thermal blanket, respecting the temperature and time parameters.

Due to the hygroscopic characteristic of plaster, it was necessary to adapt the oven with exhaust fans to remove the moisture formed during the polymerization reaction (a reaction that forms water as a by-product). The permanence of the water-saturated atmosphere inside the oven, as the polymerization reaction progresses, causes reactional equilibrium, delaying or even preventing the curing of the material. This effect is not observed in loads that do not have a hygroscopic character. If the stove is replaced with a thermal blanket to use hygroscopic loads, openings must be maintained to allow moisture to escape for the same effect as previously described.

Process for Preparing the Sleeper (or Products in General) of the Present Invention The sleeper of the present invention is preferably prepared from the process that comprises the following steps:

A. Preparation of the composite according to the process described above;

B. Molding in the sleeper mold in the appropriate gauge to be produced. During molding, anchoring materials can be introduced into the sleeper, such as intermediate layers of glass fiber blanket and/or long fibers longitudinal to the sleeper, which can be distributed in layers or grouped in bundles.

C. Pressing with a load of approximately 10 to 30 tons of force for approximately 10 to 60 seconds. Optionally, pressing can be replaced by vibration, using an internal vibrator in the dough, for a period of 20 to 60 seconds, trying not to reach the fibers.

D. Pre-cure in an ambient pressure oven, with air circulation, at a temperature of 50 to 80° C. for approximately 1 to 2 hours and subsequent curing for at least 7 days at ambient pressure and temperature. Due to the larger volume of the sleeper associated with the hygroscopic characteristic of the plaster, it was necessary to adapt the greenhouse with two side exhaust fans to remove the humidity formed during the polymerization reaction (a reaction that forms water as a byproduct). The permanence of the water-saturated atmosphere inside the oven, as the polymerization reaction progresses, causes the reaction equilibrium to slow down or even prevent the curing of the material. This effect is not observed in loads that do not have a hygroscopic character. Optionally, the stove can be replaced with a thermal blanket, respecting the temperature and time parameters. If the stove is replaced with a thermal blanket to use hygroscopic loads, openings must be maintained to allow moisture to escape for the same effect as previously described.

Molded-In-Place Composite Preparation Process:

The polymer composite of the present invention is preferably prepared from the process that comprises the following steps:

A. Drying of sand and plaster/or gypsum;

B. Weighing of each component consisting of at least one resin, sand, fine loads, preferably plaster;

C. Mix dry components including sand and at least one load for about 5 to 40 minutes, until very homogeneous, using a conventional mechanical mixer (concrete mixer type, or industrial mixer) or manual mixing depending on the quantity of composite to be produced, at ambient pressure and temperature;

D. Transport of dry and mixed material to the molding site. The material must be kept in such a way that it does not absorb humidity from the environment, remaining dry until molding.

E. At the same time, in a different location or in the same location, preparation of the syrup, which is composed by the addition of at least one additive, being at least one coupling agent or one flexibilizing agent or combinations thereof in at least one resin for form the organic mixture, also called syrup. Mix for about 10 to 30 seconds.

F. Transporting the syrup to the molding site. The syrup has a minimum shelf life of 7 days and can be used in molding within this period without any change in its properties.

G. At the place and time of molding, the launcher is added to the organic mixture or syrup and mixed for approximately 10 to 30 seconds, until a homogeneous appearance is obtained at the molding site.

H. Addition of the organic mixture or syrup to the mixer containing the dry aggregate mixture and subsequent mixing for up to 5 minutes, until it presents a homogeneous appearance at the molding site.

I. Pumping, distribution and leveling of the mixture at the molding site.

J. Optionally, depending on the structure to be molded, insertion of the anchoring element, preferably a bundle of long glass fibers, longitudinally accommodated in the mold, which can be replaced by layers of fiberglass blanket. This step is optional depending on the application.

K. Passage of a compressor roller to compact the material, as in the case of roadways. The number of passes depends on the thickness of the structure; for lanes up to 3 cm thick, a single pass is sufficient. Optionally, the passage of the compressor roller can be replaced by vibration, if the structure to be molded is thicker than 12 cm. The vibration process is carried out using an internal vibrator in the mass, for a period of 10 to 20 seconds at each vibrated point. The number of vibration points will depend on the size of the structure.

L. Pre-cure with a thermal blanket at ambient pressure, with air circulation, at a temperature of 50 to 80° C. for approximately 60 to 180 minutes.

Due to the hygroscopic characteristic of plaster, molding in situ during rainy periods is not viable. For the same reason, on-site molding in extremely humid environments is not possible. Molding must be carried out in dry environments and solid materials must be kept in closed containers until molding, preventing them from adsorbing moisture from the air.

First Example of the Composition of the Composite of the Present Invention

Below is an example of the embodiment of the polymeric composite of the present invention:

| Raw material | Amount (%) |
| --- | --- |
| Resin | 9.0-15.0 |
| Launcher | 1.0 |
| Plaster | 10.0-15.0 |
| Sand | 53.0-60.0 |
| Flexibilizing Agent (Ex.: acrylic acid) | 0.2-0.8 |
| Coupling Agent (Ex.: vinyltrimethoxysilane) | 0.2-0.8 |
| Foundry Sand | 10.0-15.0 |

In the present embodiment, the pre-accelerated resin may, optionally, already contain a reaction promoter, preferably 0.25% to 2.50% cobalt naphthenate.

In the present embodiment, the 1% amount of launcher allows a working time of approximately 15 minutes. If this quantity is reduced, for example, to 0.5%, the working time becomes approximately 29 minutes. Optionally, a launcher concentration between 0.10% and 3.00% by mass can be used based on the total mass of the composite.

In the present embodiment, the content of loads, selected from at least one of granular silica or microspheres, high and low purity alumina quartz, foundry sand, fine or ultrafine sand, limestone, talc, crushed stone powder, plaster, lime, dolomite, calcite, barite, in natura or organophilic bentonite, in natura or organophilic kaolinite, in natura or organophilic metakaolinite, in natura or organophilic attapulgite, in natura or organophilic montmorinolite, in natura or organophilic illite, antigorite in natural or organophilic, in natura or organophilic anite, in natura or organophilic sepiolite, in natura or organophilic vermiculite, porous magnetite, calcium carbonate, magnesium carbonate, mica, graphite, gypsum and gylsonite and/or a combination of these, if refers to the total amount of aggregate when added to the sand content;

In the present embodiment, the aggregates must not exceed 1% moisture. All loads must be dried to ensure moisture control. In the case of plaster, due to its highly hygroscopic nature, after drying it must be kept in a closed container and the humidity control must be below 0.6% humidity, immediately before preparing the composite.

Second Example of Composition of the Composite of the Present Invention

In an example embodiment, the polymer composite of the present invention comprises:

| Raw material | Amount (%) |
| --- | --- |
| Resin | 9.0-15.0 |
| Launcher | 0.10%-3.00% |
| Plaster | 9-13.0 |
| Sand | 50.0-58.0 |
| Flexibilizing Agent | 0.2-0.8 |
| Coupling Agent | 0.2-0.8 |
| Waste sand from mining process | 10.0-20.0 |
| Carbon fiber | 0.2-1.0 |

In the present embodiment, the pre-accelerated resin may already contain a reaction promoter, preferably 0.25% to 2.50% cobalt naphthenate.

In the present embodiment, the amount of 0.10%-3.00% of launcher, for example, allows a working time of approximately 15 minutes. If this quantity is reduced, for example, to 0.5%, the working time becomes approximately 29 minutes. Optionally, a launcher concentration between 0.10% and 3.00% by mass can be used based on the total mass of the composite.

In the present embodiment, the load content, selected from at least one of silica, alumina, foundry sand, fine or ultrafine sand, limestone, talc, crushed stone powder, plaster, lime, dolomite, bento-nite, barite, attapulgite, sepiolite, vermiculite, porous magnetite, calcium carbonate, magnesium carbonate, mica, graphite, gypsum and gilsonite and/or a combination of these, refers to the total amount of aggregate when added to the sand content;

In the present embodiment, the aggregates must not exceed 1% moisture. All loads must be dried to ensure moisture control. In the case of plaster, due to its highly hygroscopic nature, after drying it must be kept in a closed container and the humidity control must be below 0.6% humidity, immediately before preparing the composite.

The present embodiment also comprises carbon fiber. The amount of carbon fiber is between 0.05% and 10%, or preferably, 0.1% and 5%, or more preferably, 0.2% and 1% by mass, based on the total mass of the composite. Furthermore, the fiber comprised in the composite of the present embodiment has a fiber length between 70% and 99%, preferably, between 85% and 95%, or even more preferably, between 88% and 92% of the length of the part. Optionally, other types of fiber mentioned in this report may be used in place of carbon fiber.

Third Example of Composition of the Composite of the Present Invention

In an example embodiment, the polymeric composite of the present invention comprises:

An amount of 38% to 96% by mass of sand.

An amount of 3% to 33% by mass of load, with the load being selected from at least one of: plaster, gypsum, gilsonite, calcite, dolomite or a combination of plaster and gypsum.

Preferably an amount of 3% to 33% by mass of dicyclopentadienode or an amount of 5% to 30% by mass neopentylglycol. Alternatively, an amount of 3% to 33% by mass of a combination of dicyclopentadienode and neopentylglycol, with the dicyclopentadiene being in a ratio of 70-90% of the mixture and the nepentylglycol 30-10% of the mixture.

An amount of 0.1% to 1.5% by weight of coupling agent or phase compatibilizing additive, the coupling agent being preferably vinyltrimethoxysilane, vinyltriethoxysilane or methacryltri-methoxysilane.

An amount of 0.1% to 1.5% by weight of flexibilizing agent or flexibilizing additive, the flexibilizing agent preferably being acrylic acid, methacrylic acid, buylmethylacrylate or triethylene glycol methacrylate.

Optionally, an amount of 0.1% to 1.5% by mass of launcher, the launcher being preferably composed of methyl ethyl ketone peroxide, of medium reactivity, desensitized with dimethylphthalate.

Optionally, an amount of 0.25% to 2.5% by weight of reaction promoter, the reaction promoter being preferably cobalt naphthenate or cobalt octoate.

The present embodiment further comprises carbon fiber. The amount of carbon fiber is between 0.05% and 10%, or preferably, 0.1% and 5%, or more preferably, 0.2% and 1% by mass, based on the total mass of the composite. Furthermore, the fiber comprised in the composite of the present embodiment has a fiber length between 70% and 99%, preferably, between 85% and 95%, or even more preferably, between 88% and 92% of the length of the part. The preferential use of carbon fiber is due to its greater mechanical resistance, when compared to other fibers, which allows a smaller quantity of fibers to be used, compensating for its higher cost. Another effect refers to the better mechanical properties observed in preliminary tests. The use of carbon fiber resulted in a material with superior tensile strength, reduced cracking, and increased impact resistance.

The embodiment examples mentioned above can be adjusted or complemented with general information about the invention provided in this report, considering components, concentrations, quantities and other technical details. Any adjustments of 1%, 2%, 3%, 4%, 5%, 6%, 7%, 8%, 9% and/or 10% can be applied to adjust the ranges of concentrations and magnitudes mentioned, still obtaining a result possibly similar to that described for the present invention or at least acceptable depending on the application. The components described for the polymeric composite of the present invention can also be combined in other ways than those described in the examples above to achieve the desired final result.

Tests

Mechanical Properties of the Material The determination of resistance to axial compression and traction by diametral compression were carried out in Sileto's internal laboratory in accordance with ABNT NBR 7680-1/2015 (ASTM C39) and ABNT NBR 7222:2011. (ASTM C496/C496M), in samples of the preferred embodiment obtained with dicyclopentadiene resin (DCPD). The results showed an axial compressive strength value of (87.5±1.4) MPa with 14 days of curing and (95.5±0.2) MPa with 21 days of curing. The tensile strength due to diametral compression was found to be (9.88±0.34) MPa with 14 days of curing and (10.91±0.35) MPa after 21 days of curing. In a traditional concrete, Portland cement presents values of around 10 to 45 MPa of axial compressive strength and around 2 to 7 MPa of diametrical compression tensile strength, depending on the water/cement ratio used. Therefore, the preferred embodiment of the present invention is more resistant to both axial compression and diametrical compression than the traditional embodiment of Portland cement.

The 4-point flexural strength was also evaluated internally at the Sileto laboratory in accordance with the ABNT NBR 12142 Standard—Concrete—Determination of the tensile strength in flexion of prismatic specimens (ASTM C78), in a preferred embodiment sample obtained with dicyclopentadiene resin (DCPD). The results found were 152 kN of breaking force (20.3 MPa) after 14 days of curing of the material and 173 kN of breaking force (23.1 MPa) after 21 days of curing.

Determination of abrasive wear was tested in a certified laboratory at Falcão Bauer (Quality Control Technological Center) in accordance with ABNT NBR 9781-1/2013 Standards—Concrete Parts for Paving—Specification and Test Methods (ASTM C936/C936M—20), in samples of the preferred embodiment obtained with dicyclopentadiene resin (DCPD). The results showed an abrasion wear value of 19.0 mm, which according to the ABNT NBR 9781 standard (ASTM C936/C936M—20) classifies the material as high resistance, as it is below 20.0 mm of wear per abrasion.

The determination of compressive strength and water absorption capacity were also carried out in a certified laboratory at Falcao Bauer (Technological Center for Quality Control) in accordance with ABNT Standards NBR 9781-1/2013—Concrete Parts for Paving—Specification and Test Methods (ASTM C936/C936M—20), in samples of the preferred embodiment obtained with dicyclopentadiene resin (DCPD). The compressive strength results of the interlocking floors of this preferred embodiment were (105±12) MPa, being classified as a high-resistance floor as it presents a compressive strength greater than 50 MPa. Regarding water absorption capacity, the interlocking floor obtained from the preferred embodiment presented an average result of 1.2% and a maximum of 2.1%, being approved as the criterion is an average absorption capacity of 6.0% and maximum of 7.0%.

The evaluation of the durability under pressure of the material obtained in a preferred embodiment obtained with dicyclopentadiene resin (DCPD) was carried out in the Department of Civil and Environmental Engineering at Florida International University. This evaluation was carried out according to methodology and equipment developed by the institution in which the test specimens are immersed in liquid that undergoes hydraulic pressure and maintained for a determined time to identify their durability at high pressures, such as in off-duty applications. shore. The specimens of a preferred embodiment obtained with dicyclopentadiene resin (DCPD) withstood a pressure of around 225 Psi for 1204 seconds without suffering any structural damage. This result is equivalent to the results obtained for ultra-high strength reinforced concrete (UHPC).

The Department of Civil and Environmental Engineering at Florida International University also conducted the compressive strength of test specimens obtained from a preferred embodiment of dicyclopentadiene resin (DCPD) before and after the durability assessment under pressure. The compressive strength of the material before the test was 11,742 ksi and after the test it was 11,959 ksi, indicating that the material did not suffer hydraulic damage during the test.

CTL Group, located in Skokie—Illinois, carried out tests for abrasion resistance, freezing and thawing cycles, compression resistance and water absorption. The abrasion resistance was 0.03 inches for a maximum allowable index of 0.118 inches, with the abrasion index determined at 0.01 for a maximum allowable index of 0.11 and a volume removed by abrasion of 0.06 $cm^3/cm^2$ for a maximum volume removed by abrasion of 1.7 $cm^3/cm^2$. The mass loss determined in 28 freezing and thawing cycles was 2.7 $g/m^2$ for a maximum allowable 225 $g/m^2$ and in 49 freezing and thawing cycles it was 4.0 $g/m^2$ for a maximum allowable of 500 $g/m^2$. The compressive strength for the 6 cm high test specimens was 16790 psi for a minimum allowed by the standard of 8000 psi and the determined water absorption was 0.9% by mass for a maximum allowed of 5% by mass.

The tests relating to the sleeper itself were carried out at the Acoustics and Dynamic and Static Testing Laboratory (LAEDE/IEME), certified by INMETRO to carry out these tests according to AREMA standards (American Railway Engineering and Maintenance-of-way Association) and ABNT NBR 11709:2015—Concrete sleeper—Project, materials and components.

Compression in the rail support is obtained by applying a load of 445 kN applied to the rail supported on a 360 mm×200 mm×42 mm plate at a constant rate of 120 kN/min. According to the AREMA standard: 2019, the maximum allowable elastic vertical displacement is 6.3 mm and the maximum residual vertical displacement, after 1 minute of releasing the load, is 3.18 mm. The sleeper obtained with a preferred embodiment using a dicyclopentadiene (DCPD) resin of the present invention, presented an elastic vertical displacement of 1.13 mm and a residual vertical displacement of 0.38 mm.

The pullout of the insert was carried out by applying an axial load of 53.4 kN to each insert, separately, with the load maintained for 3 minutes, with the inserts not being pulled out or damaged, nor any damage being observed, fissures or cracks, at any point on the sleeper, obtained with a preferred embodiment obtained with the dicyclopentadiene resin (DCPD) of the present invention.

The torque test on the inserts was carried out by applying a torque of 340 N·m on the vertical axis of each insert separately and maintaining it for 3 minutes, observing by visual inspection any damage, cracks or cracks, at any point of the sleeper, obtained with a preferred embodiment obtained with the dicyclopentadiene resin (DCPD) of the present invention.

Tests for positive and negative moments at the supports and in the center were carried out according to ABNT NBR 11709:2015 and AREMA:2019 using loads of 234.49 kN for the positive moment at the supports, 144.74 kN for the moment negative at the supports, 49.36 kN for the positive moment in the center and 74.51 kN for the negative moment in the center, with no damage, fissures or cracks being observed at any point of the sleeper, obtained with a preferred embodiment obtained with the dicyclopentadiene resin (DCPD) of the present invention.

The repeated loading test on the support, also called fatigue test, was carried out according to the ABNT NBR 11709:2015 standard and the AREMA:2019 standard, using variant loads in the range of 23.45 kN at 257.94 kN, at a frequency of 4 Hz, totaling 3 million loading and unloading cycles, with no damage, cracks or cracks observed at any point of the sleeper, obtained with a preferred embodiment obtained with dicyclopentadiene resin (DCPD) of the present invention.

An overload of 410.36 kN was applied to the sleeper support at a rate of 50 kN/min and left for a period of 5 minutes and subsequently unloaded, according to standards NBR 11709:2015 and AREMA:2019 no damage, cracks or cracks were observed at any point of the sleeper, obtained with a preferred embodiment obtained with the dicyclopentadiene resin (DCPD) of the present invention. Then, the sleeper support was loaded again at the same rate until failure, which occurred with a load of 642.60 kN.

Chemical Properties

The material obtained from a preferred embodiment was evaluated in a laboratory specialized in waste classification at Qualy Lab according to the methodology and evaluation parameters contained in the ABNT NBR 10004 Standard—Solid Waste—Classification. The material was composed of pieces of the material after curing, and the material itself, also called raw mass, the leachate of the material, and the solubilized material were evaluated. All results were below the limits of the parameters allowed by the ABNT NBR 10004 Standard, without the waste classified as Class II B—Inert Non-Hazardous Waste.

Having described embodiment examples, it must be understood that the scope of the present invention covers other possible variations, being limited only by the content of the attached claims, including possible equivalents.

The invention claimed is:

1. Polymeric composite, comprising:
sand;
at least one load selected from at least one of: granular silica or microspheres, alumina quartz, foundry sand, fine or ultrafine sand, limestone, talc, crushed stone powder, gypsum, lime, dolomite, calcite, barite, in natura or organophilic bentonite, in natura or organophilic kaolinite, natural or organophilic metakaolinite, in natura or organophilic attapulgite, in natura or organophilic montmorinolite, raw or organophilic illite, raw or organophilic hinorite, raw or organophilic anite, sepiolite, vermiculite, porous magnetite, calcium carbonate, magnesium carbonate, mica, graphite, gypsum, gilsonite or a combination of these;
a thermosetting resin selected from at least one of dicyclopentadiene, neopentyl glycol or a combination of these;
at least two additives, wherein one of the additives is a phase compatibilizing additive and the other additive is a flexibilizing additive, wherein the phase compatibilizing additive is selected from at least one of: vinyltrimethoxysilane, vinyltriethoxysilane, methacryltrimethoxysilane, methacryloxypropyltrimethoxysilane, calcium diacrylate, calcium diacrylate zinc or a combination of these, and wherein the flexibilizing additive is selected from at least one of: butylacrylate, butylmethylacrylate, methylmethacrylate, acrylic acid, methacrylic acid, phthalic anhydride, maleic anhydride, dialylphthalate, triethylene glycol methacrylate, ethylhexyl methacrylate or a combination of these; and
a fiber, wherein the fiber is carbon fiber and has a fiber length between 88% and 92% of the piece length.

2. Polymeric composite of claim 1, further comprising ground rubber in an amount of 0% to 30% by mass.

3. Polymeric composite of claim 1, further comprising layered fiber blankets, the fiber being selected from at least one of: metallic fiber, glass fiber, carbon fiber, aramid fiber, basalt fiber, graphite fiber, polymeric fiber or a combination of these.

4. Polymeric composite of claim 1, further comprising screens and/or frames made of metallic and/or polymeric material in layers and/or structures.

5. Polymeric composite of claim 1, further comprising a reaction promoting system, wherein the reaction promoting system is cobalt naphthenate and is comprised in an amount of 0.25% to 2.5% by mass of the composite.

6. Polymeric composite of claim 5, wherein the reaction promoting system is associated with dimethylaniline, DMA, in an amount of 0.025% to 0.10% by weight based on the total weight of the composite.

7. Polymeric composite of claim 1, further comprising a launcher in an amount ranging from 0.05% to 6.00% by mass based on the total mass of the composite.

8. Polymeric composite of claim 1, further comprising:
from 38% to 96% by mass of medium sand based on the total mass of the composite;
from 3% to 33% by mass of load based on the total mass of the composite;
from 3% to 33% by mass of dicyclopentadiene and/or from 5% to 30% by mass neopentylglycol based on the total mass of the composite;
from 0.1% to 1.5% by mass of phase compatibilizing additive based on the total mass of the composite;
from 0.1% to 1.5% by weight of flexibilizing additive based on the total weight of the composite; and
from 0.1% to 5%, by mass of carbon fiber based on the total mass of the composite.

9. Product with polymeric composite, wherein the product is a sleeper that comprises the polymeric composite as defined in claim 1.

10. Dry polymer composite preparation process to prepare the polymeric composite of claim 1, comprising:
mixing sand and load for a period of 5 minutes to 40 minutes to form a mixture of dry components;
mixing at least one phase compatibilizing additive and at least one flexibilizing additive with a thermosetting resin for a time of 10 seconds to 30 seconds to form a syrup;
transporting the dry mix and syrup to the molding site, ensuring that the syrup has a chemical stability period of at least 7 days;
mixing the syrup with the mixture of dry components for a time of up to 5 minutes;
pouring the mixture into the mold or distribute and level the mixture in the molding location according to the final product to be obtained;
inserting, into the material obtained, at least one anchoring element comprising bundles of fibers, wherein the fiber is carbon fiber;
pre-cure the material obtained in an ambient pressure oven with air circulation or with thermal blankets, at a temperature of 50 to 80° C. for a period of 60 minutes to 180 minutes; and perfoming the cure of the material obtained for at least 7 days at ambient pressure and room temperature.

11. Process for preparing a dry polymeric composite of claim 10, further comprising a step of drying the sand and load before these components are mixed.

12. Process for preparing a dry polymeric composite of claim 10, further comprising a step of mixing a launcher with the syrup for a time of 10 seconds to 30 seconds before the step of mixing the syrup with the mixture of dry components.

13. Process for preparing a dry polymeric composite of claim 10, further comprising a step of pressing, with a press or compressor roller, the material obtained for a time of 20 seconds to 60 seconds, or alternatively vibrate the material before the pre-curing step.

14. Process for preparing a dry polymeric composite of claim 10, further comprising a step of removing moisture using an oven comprising exhaust fans.

15. Process of preparing a product, comprising: preparing a polymeric composite according to the preparation process as defined in claim 1, and shaping the material into a product mold before the step of inserting the anchoring elements.

16. Process for preparing a product of claim 15, wherein the pressing step is carried out with a load of 10 to 30 tons of force, alternatively the pressing step can be replaced by the to vibrate, in at least 5 different positions of the product for at least 10 seconds in each position.

17. Process for preparing a product of claim 15, wherein the anchoring elements comprise intermediate layers of blanket made of at least one of: carbon fiber, metallic fiber, glass fiber, fiber of aramid, basalt fiber, graphite fiber, polymeric fiber or a combination of these, in which the fibers are long longitudinal to the product, being distributed in layers or grouped in bundles.

18. Process for preparing a product of claim 15, further comprising a step of removing moisture using an oven comprising at least two side exhaust fans.

\*   \*   \*   \*   \*